US011190717B2

(12) United States Patent
Suzuki et al.

(10) Patent No.: US 11,190,717 B2
(45) Date of Patent: Nov. 30, 2021

(54) SOLID STATE IMAGE SENSOR, IMAGE CAPTURING APPARATUS, AND IMAGE CAPTURING METHOD

(71) Applicant: CANON KABUSHIKI KAISHA, Tokyo (JP)

(72) Inventors: Satoshi Suzuki, Tokyo (JP); Hirokazu Kobayashi, Tokyo (JP); Nobuhiro Takeda, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/930,972

(22) Filed: Jul. 16, 2020

(65) Prior Publication Data

US 2020/0358972 A1    Nov. 12, 2020

Related U.S. Application Data

(63) Continuation of application No. PCT/JP2018/044168, filed on Nov. 30, 2018.

(30) Foreign Application Priority Data

Jan. 22, 2018  (JP) .............................. JP2018-008096

(51) Int. Cl.
*H04N 5/355* (2011.01)
*H04N 5/3745* (2011.01)

(52) U.S. Cl.
CPC ........... *H04N 5/355* (2013.01); *H04N 5/3745* (2013.01)

(58) Field of Classification Search
CPC .. H04N 5/355; H04N 5/3745; H04N 5/37455; H04N 5/35527

USPC ....................................................... 348/222.1
See application file for complete search history.

(56) References Cited

U.S. PATENT DOCUMENTS 4,710,817 A * 12/1987 Ando ..................... H04N 5/357
                                                         348/241
2011/0235771 A1 * 9/2011 Aull ................... H04N 5/37455
                                                         377/19

FOREIGN PATENT DOCUMENTS

| JP | 61-152176 A | 7/1986 |
| JP | 2000-253320 A | 9/2000 |
| JP | 2016-029753 A | 3/2016 |

OTHER PUBLICATIONS

The International Search Report of International Application No. PCT/JP2018/044168 dated Feb. 5, 2019.

* cited by examiner

*Primary Examiner* — Nhan T Tran
*Assistant Examiner* — Chan T Nguyen
(74) *Attorney, Agent, or Firm* — Cowan, Liebowitz & Latman, P.C.

(57) ABSTRACT

The present invention provides a solid state image sensor, an image capturing apparatus, and an image capturing method that can realize a wide dynamic range while suppressing an increase in a signal amount. A solid state image sensor includes a sensor that issues pulses at a frequency corresponding to a frequency at which photons are incident; and a counter circuit that thins out the pulses issued from the sensor at a thinning ratio corresponding to the number of pulses issued from the sensor, and counts the pulses.

9 Claims, 10 Drawing Sheets

|  | COUNT VALUE | COUNT FREQUENCY |
|---|---|---|
| STAGE 1 | 0 ~ 15 | 1 COUNT FOR 1 PHOTON |
| STAGE 2 | 16 ~ 255 | 1 COUNT FOR 2 PHOTONS |
| STAGE 3 | 256 ~ 4095 | 1 COUNT FOR 4 PHOTONS |
| STAGE 4 | 4096 ~ 16383 | 1 COUNT FOR 8 PHOTONS |

|  | COUNT VALUE | COUNT FREQUENCY |
|---|---|---|
| STAGE 1' | 0 ~ 255 | 1 COUNT FOR 1 PHOTON |
| STAGE 2' | 256 ~ 16383 | 1 COUNT FOR 2 PHOTONS |
| STAGE 3' | EXCEEDING 16383 | FIXED COUNT VALUE |

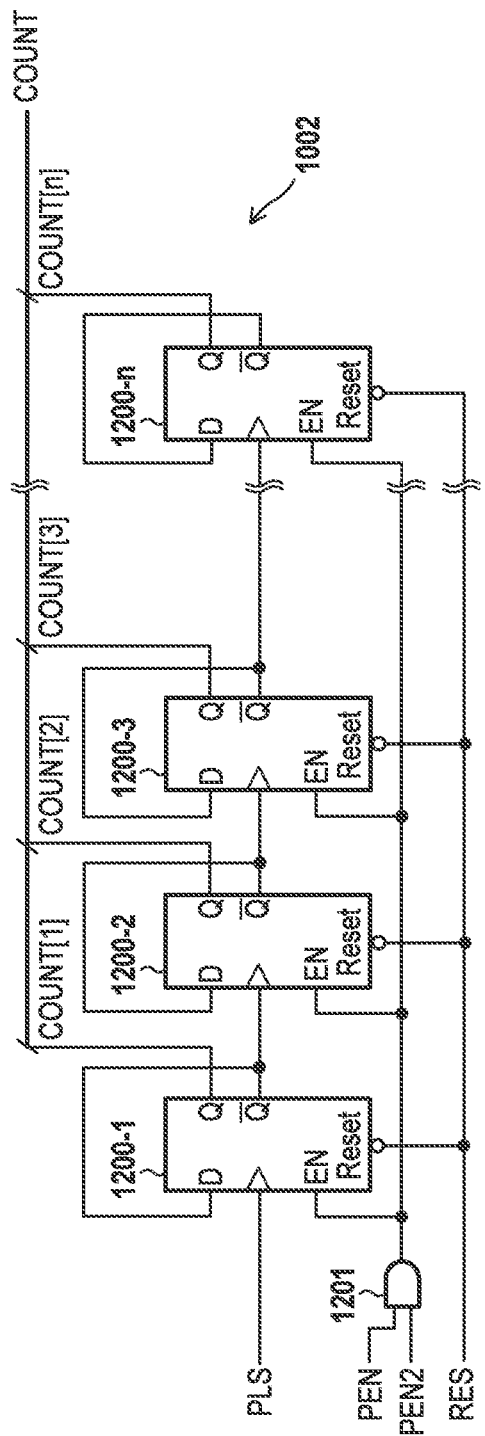
F I G. 12

SOLID STATE IMAGE SENSOR, IMAGE CAPTURING APPARATUS, AND IMAGE CAPTURING METHOD

CROSS-REFERENCE TO RELATED APPLICATIONS

This application is a Continuation of International Patent Application No. PCT/JP2018/044168, filed Nov. 30, 2018, which claims the benefit of Japanese Patent Application No. 2018-008096, filed Jan. 22, 2018, both of which are hereby incorporated by reference herein in their entirety.

BACKGROUND OF THE INVENTION

Field of the Invention

The present invention relates to a solid state image sensor, an image capturing apparatus, and an image capturing method.

Background Art

CCD image sensors and CMOS image sensors are widely known as image sensors that use semiconductors. CCD image sensors and CMOS image sensors convert light that is incident on pixels during an exposure period into charges using photodiodes, and output a signal corresponding to the charges.

In recent years, an image sensor of a photon counting method, which counts the number of photons that are incident on photodiodes during an exposure period and outputs a count value of the photons as a signal value, has been proposed. For example, PTL 1 discloses a solid state image capturing apparatus that uses an avalanche photodiode and a counter. When a reverse bias voltage higher than a breakdown voltage is applied to the avalanche photodiode, carriers generated by the incidence of a single photon cause avalanche breakdown, and a large current flows through this avalanche photodiode. By counting pulse signals corresponding to the incidence of a single photon using the counter, a signal corresponding to the number of single photons can be obtained. An image sensor of a photon counting method uses the number of photons that have been incident on photodiodes as is as a signal value, and is therefore less susceptible to the influence of noise compared to CCD image sensors and CMOS image sensors. Thus, an image sensor of a photon counting method can obtain favorable images even in an environment with weak light.

CITATION LIST

Patent Literature

PTL1: Japanese Patent Laid-Open No. S61-152176

However, to simply obtain an image with a wide dynamic range, the bit width of the counter is increased. The increase in the number of bits in the counter leads to an increase in a signal amount, and also becomes an obstacle to increasing the number of pixels.

The present invention provides a solid state image sensor, an image capturing apparatus, and an image capturing method that can realize a wide dynamic range while suppressing an increase in a signal amount.

SUMMARY OF THE INVENTION

According to an aspect of the present invention, there is provided a solid state image sensor, comprising: a sensor that issues pulses at a frequency corresponding to a frequency at which photons are incident; and a counter circuit that thins out the pulses issued from the sensor at a thinning ratio corresponding to the number of pulses issued from the sensor, and counts the pulses.

Further features of the present invention will become apparent from the following description of exemplary embodiments with reference to the attached drawings.

BRIEF DESCRIPTION OF THE DRAWINGS

FIG. 12 is a diagram showing a counter included in a unit pixel of the solid state image sensor according to the second embodiment.

DESCRIPTION OF THE EMBODIMENTS

Embodiments of the present invention will be described below using the drawings. Note that the present invention is not limited to the following embodiments, and can be changed where appropriate. Furthermore, the following embodiments may be combined where appropriate.

First Embodiment

A solid state image sensor, an image capturing apparatus, and an image capturing method according to a first embodiment will be described using FIG. 1 to FIG. 9B.

The solid state image sensor according to the present embodiment thins out pulses issued from a sensor unit 300 at a thinning ratio corresponding to the number of pulses issued from the sensor unit 300, and counts the pulses.

Figure 1:
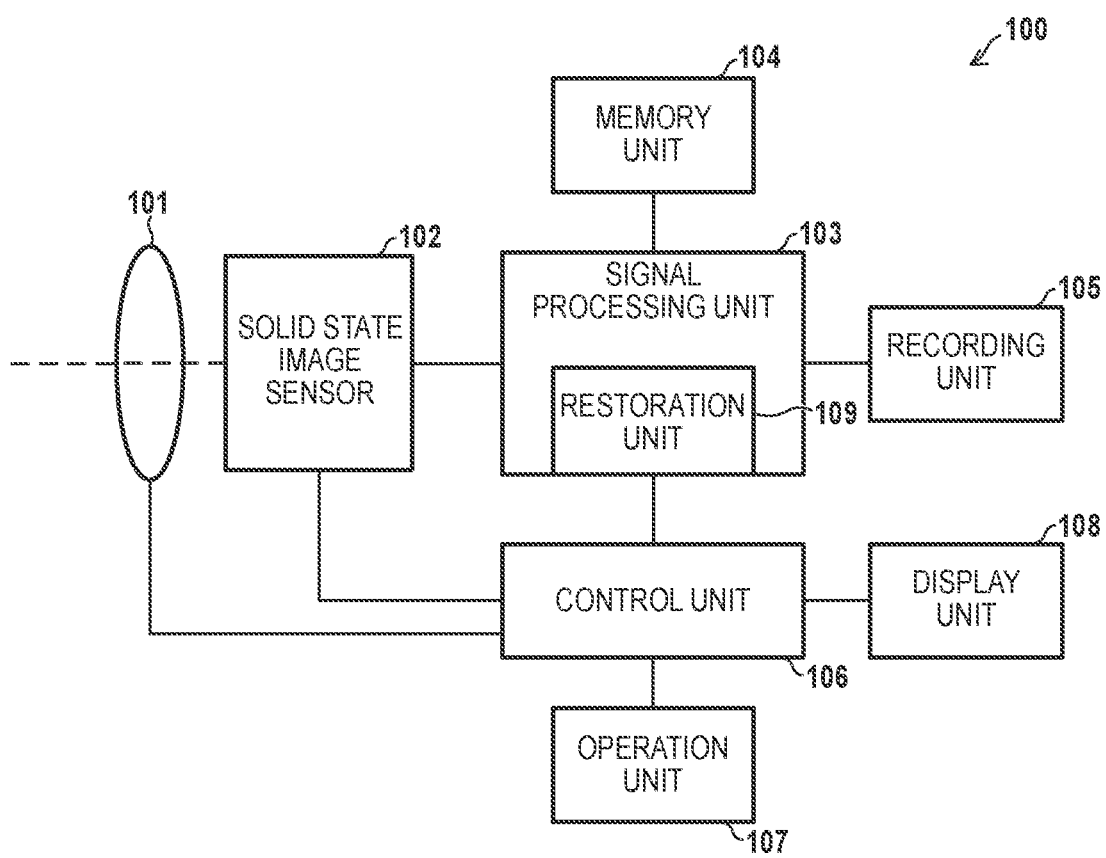
FIG. 1 is a block diagram showing an image capturing apparatus according to a first embodiment.

FIG. 1 is a block diagram showing an image capturing apparatus 100 according to the present embodiment. As shown in FIG. 1, the image capturing apparatus 100 has a solid state image sensor 102, a signal processing unit (digital signal processing unit, image processing unit) 103, a memory unit 104, a recording unit 105, a control unit 106, an operation unit 107, and a display unit 108. The image capturing apparatus 100 includes a photographing lens 101. The photographing lens 101 may be attachable to and removable from a body of the image capturing apparatus 100, or may not be attachable to and removable from the same.

An optical image generated by the photographing lens (image capturing optical system) 101 is formed on an image capturing plane of the solid state image sensor 102. The solid state image sensor 102 includes avalanche photodiodes. Therefore, the solid state image sensor 102 can detect single photons.

The signal processing unit 103 performs predetermined signal processing (digital signal processing, image processing) with respect to an image signal output from the solid state image sensor 102. Examples of such signal processing include signal amplification, reference level adjustment, defect correction, and the like. The signal processing unit 103 includes a restoration unit 109.

Non-illustrated compression pattern information output from the solid state image sensor 102 is supplied to the control unit 106. The control unit 106 supplies this compression pattern information to the restoration unit 109. Based on the compression pattern information supplied from the control unit 106, the restoration unit 109 performs restoration processing so that the image signal compressed by the solid state image sensor 102 turns into a linear signal corresponding to the number of incident photons.

The control unit 106 controls the entirety of the image capturing apparatus 100. The control unit 106 performs control with respect to the solid state image sensor 102. The control unit 106 also performs predetermined processing with respect to the image signal output from the solid state image sensor 102.

Image data output from the signal processing unit 103 is temporarily held in the memory unit 104. The display unit 108 displays shot images, live-view images, various types of setting screens, and the like. The operation unit 107 is various types of interfaces for a user to operate the image capturing apparatus 100. The control unit 106 controls each function block based on an operational instruction that is given by the user via the operation unit 107. The recording unit 105 includes a non-illustrated recording medium. The recording medium may be attachable to and removable from the recording unit 105, or may not be attachable to and removable from the same. Image data and the like are recorded in the recording medium. For example, a nonvolatile memory, a memory card, or the like is used as the recording medium.

Figure 2:
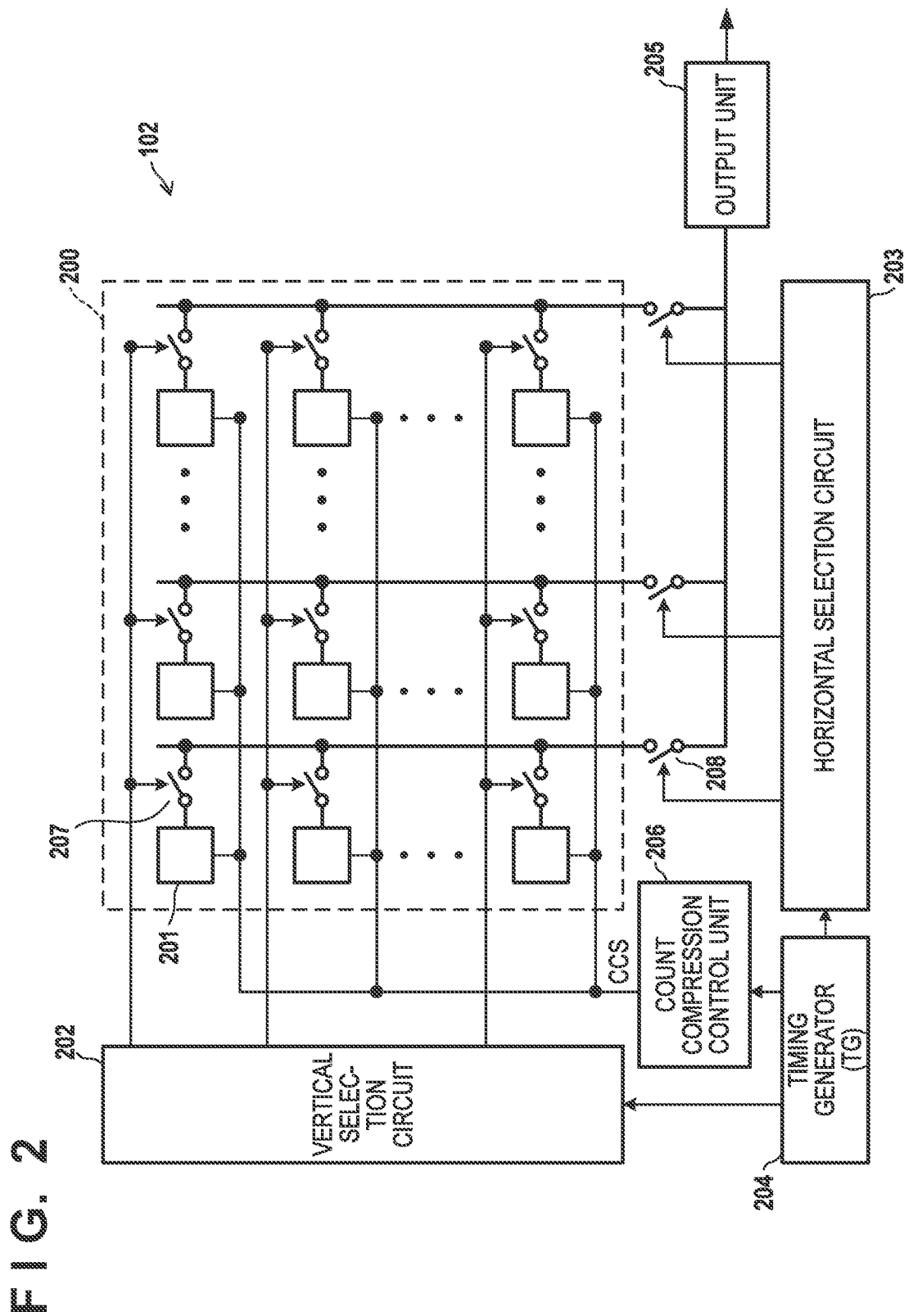
FIG. 2 is a block diagram showing a solid state image sensor according to the first embodiment.

FIG. 2 is a block diagram showing the solid state image sensor 102 according to the present embodiment. As shown in FIG. 2, the solid state image sensor 102 has a pixel array (pixel region) 200, a vertical selection circuit 202, a horizontal selection circuit 203, a timing generator (TG) 204, an output unit 205, and a count compression control unit 206.

In the pixel array 200, a plurality of unit pixels 201 are arranged in a matrix. Here, for the sake of simple explanation, only unit pixels 201 of three rows×three columns are shown; however, in reality, a large number of unit pixels 201 are arranged in the pixel array 200.

The vertical selection circuit 202 selects unit pixels 201 included in the pixel array 200 on a per-row basis using switches 207. The horizontal selection circuit 203 selects unit pixels 201 included in the pixel array 200 on a per-column basis using switches 208. A signal output from a unit pixel 201 selected by the vertical selection circuit 202 and the horizontal selection circuit 203 is output to the outside of the solid state image sensor 102 via the output unit 205.

The count compression control unit 206 supplies a count compression control signal CCS, which is intended to determine a thinning ratio at the time of counting the number of incident photons, to each of the plurality of unit pixels 201 included in the pixel array 200.

The timing generator 204 supplies a control signal to the vertical selection circuit 202, the horizontal selection circuit 203, and the count compression control unit 206. Furthermore, the timing generator 204 supplies a control signal also to each of the plurality of unit pixels 201 included in the pixel array 200 via non-illustrated wires.

Figure 3:
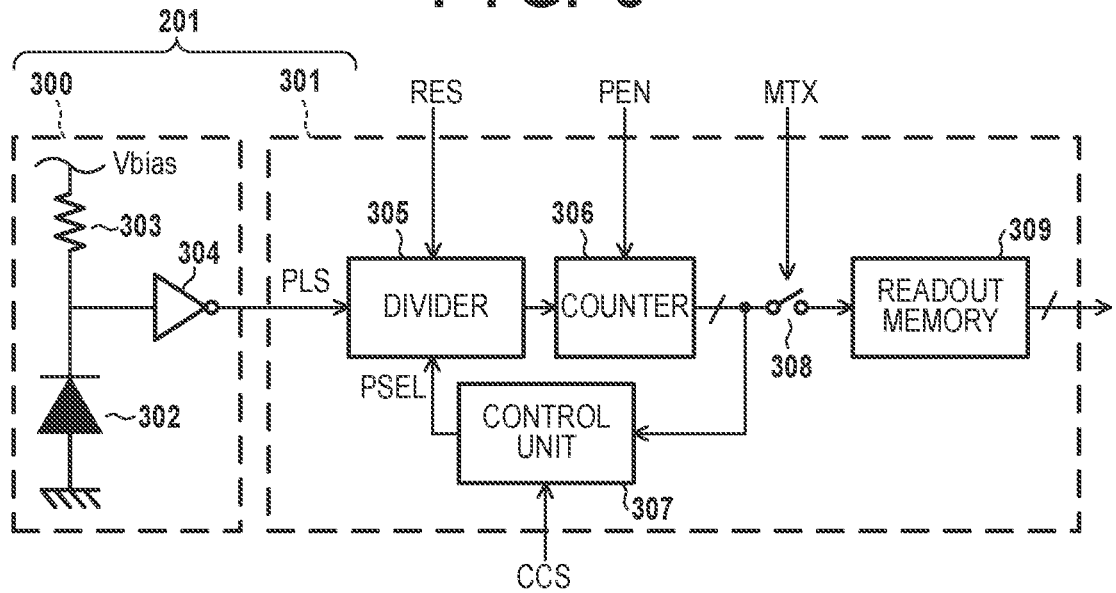
FIG. 3 is a diagram showing a unit pixel included in the solid state image sensor according to the first embodiment.

FIG. 3 is a diagram showing a unit pixel 201 included in the solid state image sensor 102 according to the present embodiment.

The unit pixel 201 includes a sensor unit 300 and a counter unit 301. The sensor unit 300 has a photodiode 302, a quenching resistor 303, and an inverting buffer 304, and issues a pulse at a frequency corresponding to a frequency at which photons are incident. The photodiode 302 is an avalanche photodiode. A bias voltage Vbias that is equal to or higher than a breakdown voltage is applied to the photodiode 302 via the quenching resistor 303. Therefore, the photodiode 302 operates in a Geiger mode. That is to say, when photons are incident on the photodiode 302, an avalanche breakdown phenomenon is triggered. As a result, an avalanche current occurs, and a voltage drop occurs in the quenching resistor 303. The quenching resistor 303 is a resistor element for stopping the avalanche breakdown phenomenon of the photodiode 302. For example, a resistor component of a transistor can be used as the quenching resistor 303. When the avalanche current attributed to the avalanche breakdown phenomenon flows through the photodiode 302, a voltage drop occurs in the quenching resistor 303, and the bias voltage applied to the photodiode 302 decreases. When the bias voltage applied to the photodiode 302 becomes equal to or lower than the breakdown voltage, the avalanche breakdown phenomenon stops. Consequently, the avalanche current stops from flowing through the photodiode 302, and the bias voltage Vbias is applied to the photodiode 302 again. The inverting buffer 304 outputs a pulse signal based on a voltage change that occurred in the quenching resistor 303. That is to say, when photons are incident on the photodiode 302, a pulse signal PLS is output from the inverting buffer 304.

The counter unit 301 has a frequency divider 305, a counter 306, a control unit 307, a switch 308, and a readout memory 309. The counter unit 301 thins out pulses issued from the sensor unit 300 at a thinning ratio corresponding to the number of pulses issued from the sensor unit 300, and counts the pulses.

Pulse signals PLS that are output from the sensor unit 300 as a result of the incidence of photons are input to the frequency divider 305. The frequency divider 305 performs frequency dividing processing in accordance with a control signal PSEL supplied from the control unit 307. The configuration and operation of the frequency divider 305 will be described later using FIG. 4.

Signals output from the frequency divider 305 are input to the counter 306. The counter 306 counts the number of pulses of signals supplied from the frequency divider 305. That is to say, the counter 306 counts signals corresponding to the pulses issued from the sensor unit 300. A count value obtained through the counting operation in the counter 306 serves as a pixel signal. Also, an enable signal PEN for controlling the counting operation in the counter 306 is supplied from the timing generator 204 to the counter 306. The frequency divider 305 can function as a thinning processing unit that performs thinning processing with respect to the pulse signals PLS issued from the sensor unit 300. The configuration and operation of the counter 306 will be described later using FIG. 5.

The control unit 307 supplies the control signal PSEL to the frequency divider 305 in accordance with the count compression control signal CCS supplied from the count compression control unit 206 and the count value supplied from the counter 306. The control unit 307 switches the thinning ratio at the time of counting the pulse signals PLS in accordance with the count value in the counter 306. The control unit 307 increases the thinning ratio as the count value in the counter 306 increases. Also, the control unit 307 can switch the thinning ratio in accordance with the count value in the counter 306 and the count compression control signal CCS. The count compression control signal CCS can be set in accordance with the ISO sensitivity. Therefore, the control unit 307 can switch the thinning ratio in accordance with the count value in the counter 306 and a signal corresponding to the ISO sensitivity. Control performed by the control unit 307 will be described later using FIGS. 8A, 8B and FIGS. 9A, 9B.

The readout memory 309 temporarily holds the count value obtained by the counter 306, that is to say, the pixel signal. The switch 308 switches between supply of the count value obtained by the counter 306 to the readout memory 309 and no such supply. The switch 308 is controlled by a control signal MTX supplied from the timing generator 204. A count value held in the readout memory 309 is output from a unit pixel 201 selected by the vertical selection circuit 202 and the horizontal selection circuit 203. A pixel signal that is output from the unit pixel 201 in this manner is output to the outside of the solid state image sensor 102 via the output unit 205.

Figure 4:
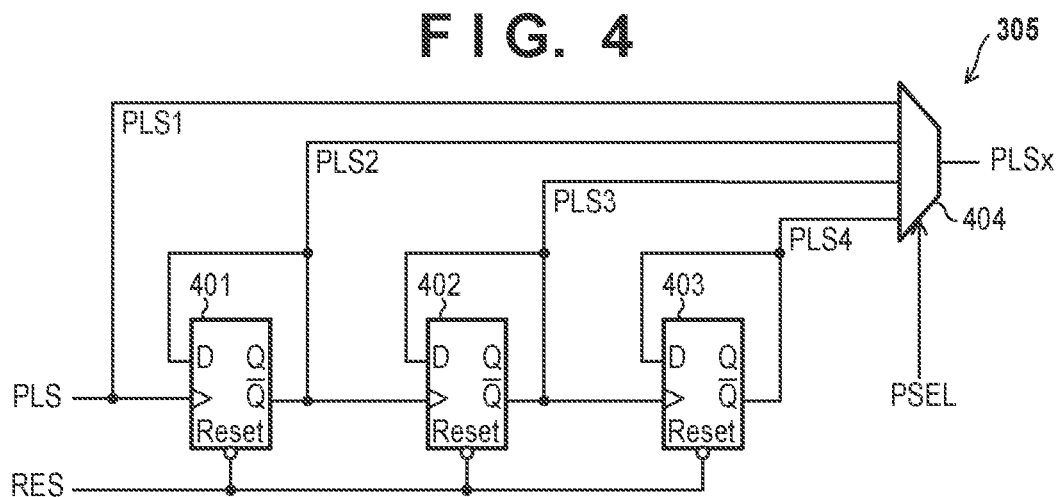
FIG. 4 is a diagram showing a frequency divider included in a unit pixel of the solid state image sensor according to the first embodiment.

FIG. 4 is a diagram showing the frequency divider 305 that is included in a unit pixel 201 of the solid state image sensor 102 according to the present embodiment. FIG. 4 shows an example of the frequency divider 305 that includes three D flip-flops 401 to 403.

The frequency divider 305 has three D flip-flops 401 to 403 and a selector 404. A control signal, or a PSEL signal, for controlling the thinning ratio at the time of counting pulse signals PLS is supplied from the control unit 307 to the frequency divider 305. Also, a reset signal RES is supplied from the timing generator 204 to the frequency divider 305.

A pulse signal PLS (PLS1) output from the sensor unit 300 is supplied to a clock terminal of the D flip-flop 401. A signal PLS2 output from an inverting output terminal /Q of the D flip-flop 401 is supplied to an input terminal D of the D flip-flop 401 and a clock terminal of the D flip-flop 402.

A signal PLS3 output from an inverting output terminal /Q of the D flip-flop 402 is supplied to an input terminal D of the D flip-flop 402 and a clock terminal of the D flip-flop 403. A signal PLS4 output from an inverting output terminal /Q of the D flip-flop 403 is supplied to an input terminal D of the D flip-flop 403.

A reset signal RES output from the timing generator 204 is supplied to reset terminals Reset of the D flip-flops 401, 402, 403. When the reset signal RES is at the H level, output terminals Q of the D flip-flops 401, 402, 403 are reset to the L level.

A two-bit control signal PSEL output from the control unit 307 is supplied to the selector 404. The signals PLS1 to PLS4 are input to the selector 404. As the signal PLS1, a pulse signal PLS output from the sensor unit 300 is used as is. The signal PLS2 is a signal that is output from the inverting output terminal /Q of the D flip-flop 401, and is a signal that is obtained by dividing the frequency of the pulse signal PLS by two. The signal PLS3 is a signal that is output from the inverting output terminal /Q of the D flip-flop 402, and is a signal that is obtained by dividing the frequency of the pulse signal PLS by four. The signal PLS4 is a signal that is output from the inverting output terminal /Q of the D flip-flop 403, and is a signal that is obtained by dividing the frequency of the pulse signal PLS by eight. The selector 404 outputs a signal that is selected from among the four signals PLS1 to PLS4 in accordance with the control signal PSEL supplied from the control unit 307.

Note that the configuration of the frequency divider 305 is not limited to this. A frequency divider 305 that can change the frequency at which a signal PLSx is placed in the H level in accordance with the control signal PSEL supplied from the control unit 307 can be used where appropriate.

Figure 5:
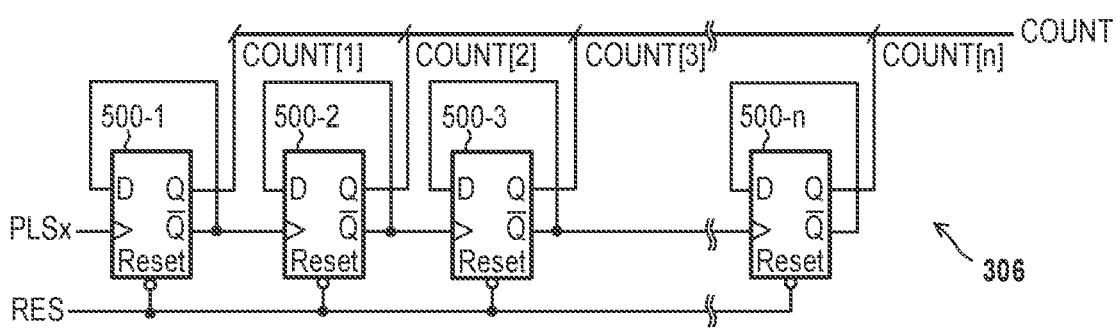
FIG. 5 is a diagram showing a counter included in a unit pixel of the solid state image sensor according to the first embodiment.

FIG. 5 is a diagram showing the counter 306 that is included in a unit pixel 201 of the solid state image sensor 102 according to the present embodiment. FIG. 5 shows an example of an n-bit counter that includes n D flip-flops 500-1 to 500-$n$. The counter 306 performs a counting operation in synchronization with a rising edge of the signal PLSx output from the frequency divider 305.

As shown in FIG. 5, the counter 306 has n D flip-flops 500-1 to 500-$n$. Reference numerals 500-1 to 500-$n$ are used in explaining individual D flip-flops, whereas a reference numeral 500 is used in explaining D flip-flops in general.

The signal PLSx output from the frequency divider 305 is supplied to a clock terminal of the D flip-flop 500-1. A signal output from an inverting output terminal /Q of the D flip-flop 500-1 is supplied to a clock terminal of the D flip-flop 500-2. A signal output from an inverting output terminal /Q of the D flip-flop 500-2 is supplied to a clock terminal of the D flip-flop 500-3. A signal output from an inverting output terminal /Q of the D flip-flop 500-$n$-1 is supplied to a clock terminal of the D flip-flop 500-$n$. That is to say, to the clock terminal of each D flip-flop 500, a signal output from the inverting output terminal /Q of the D flip-flop 500 that is disposed at an immediately preceding stage is supplied.

A reset RES signal output from the timing generator 204 is supplied to a reset terminal Reset of each D flip-flop 500. When the reset signal RES is at the H level, an output terminal Q of each D flip-flop 500 is reset to the L level. When the reset signal RES is at the L level, values of respective bits of a count value (COUNT[1], COUNT[2], . . . , COUNT[n]) are output from the output terminals Q of the respective D flip-flops 500. As the counter 306 is configured in this manner, the count value COUNT increases one by one in synchronization with a rising edge of the signal PLSx supplied from the frequency divider 305.

Note that when the enable signal PEN (see FIG. 3) input to the counter 306 is at the L level, the count value COUNT of the counter 306 is maintained without being updated even if the signal PLSx rises. When the enable signal PEN is at the H level, the count value COUNT increases in synchronization with a rising edge of the signal PLSx.

Figure 6:
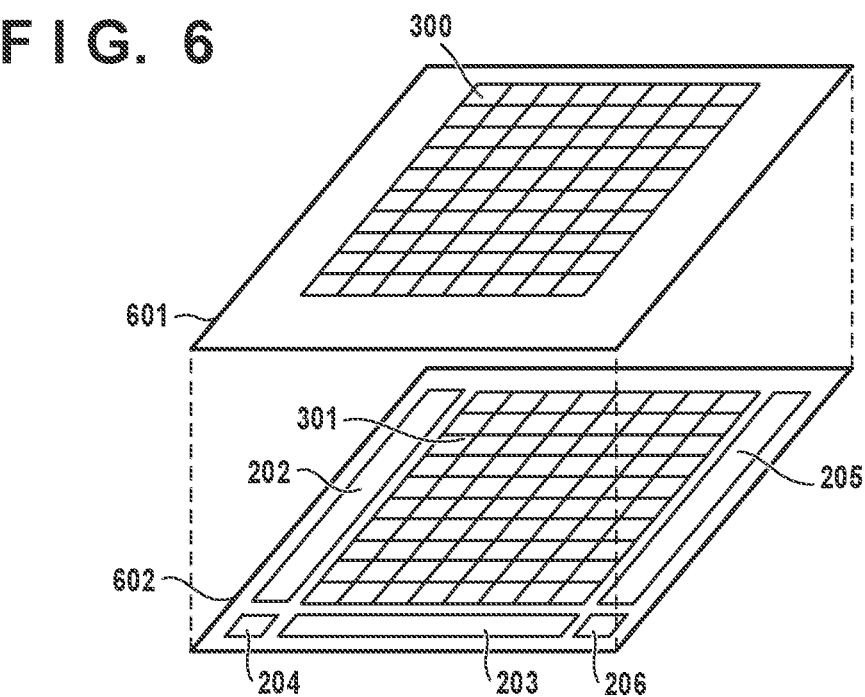
FIG. 6 is a perspective view showing a layout of the solid state image sensor according to the first embodiment.

FIG. 6 is a perspective view showing a layout of the solid state image sensor 102 according to the present embodiment. As shown in FIG. 6, the solid state image sensor 102 is configured by layering two substrates (semiconductor chips) 601, 602. As shown in FIG. 6, the solid state image sensor 102 is composed of the substrate (upper substrate, light receiving substrate) 601 on which an optical image formed by the photographing lens 101 is incident, and the substrate (lower substrate, counter unit substrate) 602 that mainly includes a circuit for a digital system. As stated earlier, a unit pixel 201 includes a sensor unit 300 and a counter unit 301. The sensor unit 300 included in the unit pixel 201 is formed on the substrate 601. The counter unit 301 included in the unit pixel 201 is formed on the substrate 602. The plurality of sensor units 300 are arranged in a matrix on the substrate 601. The plurality of counter units 301 are arranged in a matrix on the substrate 602. The plurality of respective sensor units 300 and the plurality of respective counter units 301 that correspond to these sensor units 300 are electrically interconnected, respectively via a plurality of non-illustrated through-electrodes formed on the substrate 601. In this way, the plurality of unit pixels 201 are arranged in a matrix. As stated earlier, the sensor unit 300 includes the photodiode 302, the quenching resistor 303, and the inverting buffer 304. As a signal transmitted from the sensor unit 300 to the counter unit 301 is a pulse signal, transmission from the sensor unit 300 to the counter unit 301 is relatively robust. As stated earlier, the counter unit 301 includes the frequency divider 305, the counter 306, the control unit 307, the switch 308, and the readout memory 309. The vertical selection circuit 202, the horizontal selection circuit 203, the timing generator 204, and the output unit 205 are provided on the substrate 602. Note that, here, a description is given of an exemplary case where the vertical selection circuit 202, the horizontal selection circuit 203, the timing generator 204, the output unit 205, and the count compression control unit 206 are provided on the substrate 602; however, no limitation is intended by this. For example, these constituent elements may be provided on the substrate 601 where appropriate.

As described above, in the present embodiment, the sensor units 300 are formed on the substrate 601, and the counter units 301 are formed on the substrate 602. As the counter units 301 with a large circuit scale are provided on the substrate 602 that is different from the substrate 601 on which the sensor units 300 are provided, the area of the sensor units 300 can be sufficiently ensured. Therefore, the opening area of the sensor units 300 can be sufficiently ensured.

Figure 7:
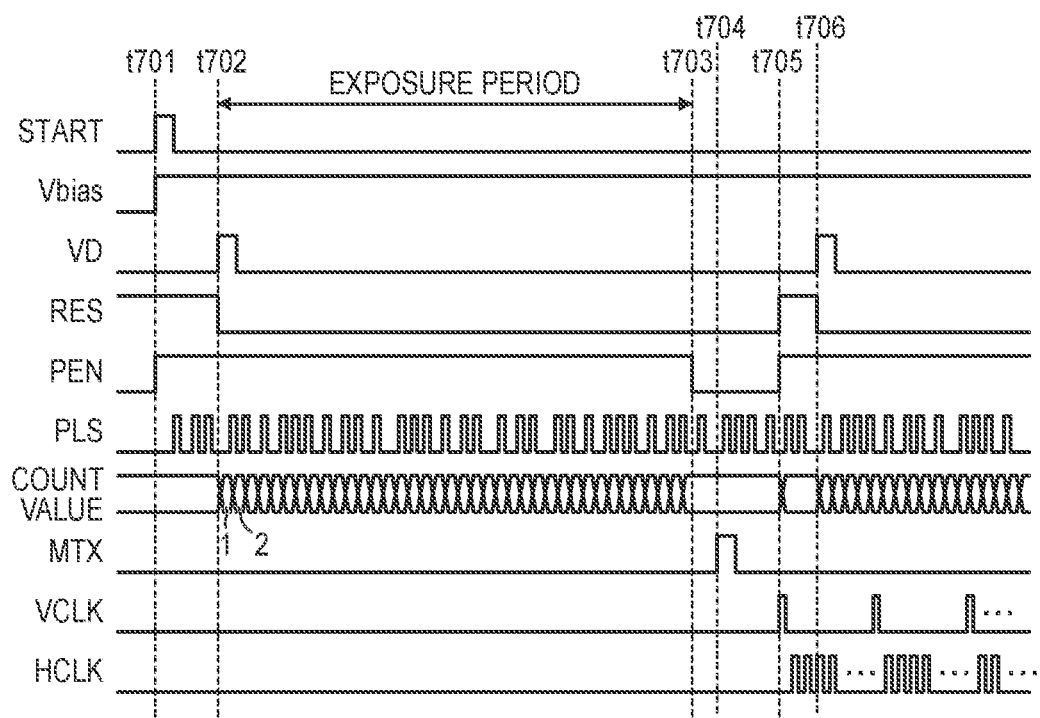
FIG. 7 is a timing chart showing an operation of the solid state image sensor according to the first embodiment.

Next, an operation of the solid state image sensor according to the present embodiment will be described using FIG. 7. FIG. 7 is a timing chart showing an operation of the solid state image sensor according to the present embodiment.

When a shooting start signal START is placed in the H level at a timing t701, a bias voltage Vbias is supplied to the sensor unit 300. The bias voltage Vbias, which is equal to or higher than a breakdown voltage of the photodiode 302, is applied to the photodiode 302, and the photodiode 302 operates in a Geiger mode. Then, in accordance with photons that are incident on the photodiode 302, a pulse signal PLS is output from the sensor unit 300. At the timing t701, as the reset signal RES is at the H level, the frequency divider 305 and the counter 306 are in a reset state. Also, at the timing t701, as the enable signal PEN is placed in the H level, the counter 306 changes from a disabled state to an enabled state.

At a timing t702, a frame synchronization signal VD is placed in the H level. Accordingly, an exposure period for the first frame is started. Then, the reset signal RES is placed in the L level, and the resetting of the frequency divider 305 and the counter 306 is cancelled. As the resetting of the frequency divider 305 and the counter 306 is cancelled, a count value of the counter 306 increases in accordance with the pulse signal PLS input to the counter unit 301.

At a timing t703, the exposure period for the first frame is ended. At the timing t703, the enable signal, or the PEN signal, is placed in the L level, and the counter 306 is placed in the disabled state. This stops the count value of the counter 306 from increasing.

At a timing t704, the control signal MTX is placed in the H level, and the switches 308 within the counter units 301 of the respective unit pixels 201 are placed in an ON state at the same time. As a result, the count values of the counters 306 of the respective unit pixels 201 are output to the readout memories 309 at the same time, and the readout memories 309 hold these count values.

At a timing t705, the reset signal RES is placed in the H level, and the frequency divider 305 and the counter 306 are reset. Also, at the timing t705, the supply of a control signal VCLK to the vertical selection circuit 202 is started. Each time the control signal VCLK is placed in the H level, the vertical selection circuit 202 selects unit pixels 201 included in the pixel array 200 in order on a per-row basis. Once the vertical selection circuit 202 has selected any one row, the switches 207 provided for the unit pixels 201 that are positioned on this row are placed in an ON state. Thereafter, a control signal HCLK is supplied to the horizontal selection circuit 203. Once the control signal HCLK has been supplied to the horizontal selection circuit 203, the switches 208 provided for the unit pixels 201 that are positioned on the respective columns are placed in an ON state in order. As a result, the count values held in the readout memories 309 included in the unit pixels 201 that are positioned on the row selected by the vertical selection circuit 202 are sequentially supplied to the output unit 205. The count values are sequentially output to the outside of the solid state image sensor 102 as image signals.

At a timing t706, the frame synchronization signal VD is placed in the H level again, and an exposure period for the second frame is started.

The foregoing operations are repeated until the last row of the pixel array 200, and outputting of image signals obtained by all of the unit pixels 201 is completed. Shooting of the $n^{th}$ frame is performed in parallel with outputting of image signals of the $(n-1)^{th}$ frame to the outside of the solid state image sensor 102.

Figures 8A, 8B:
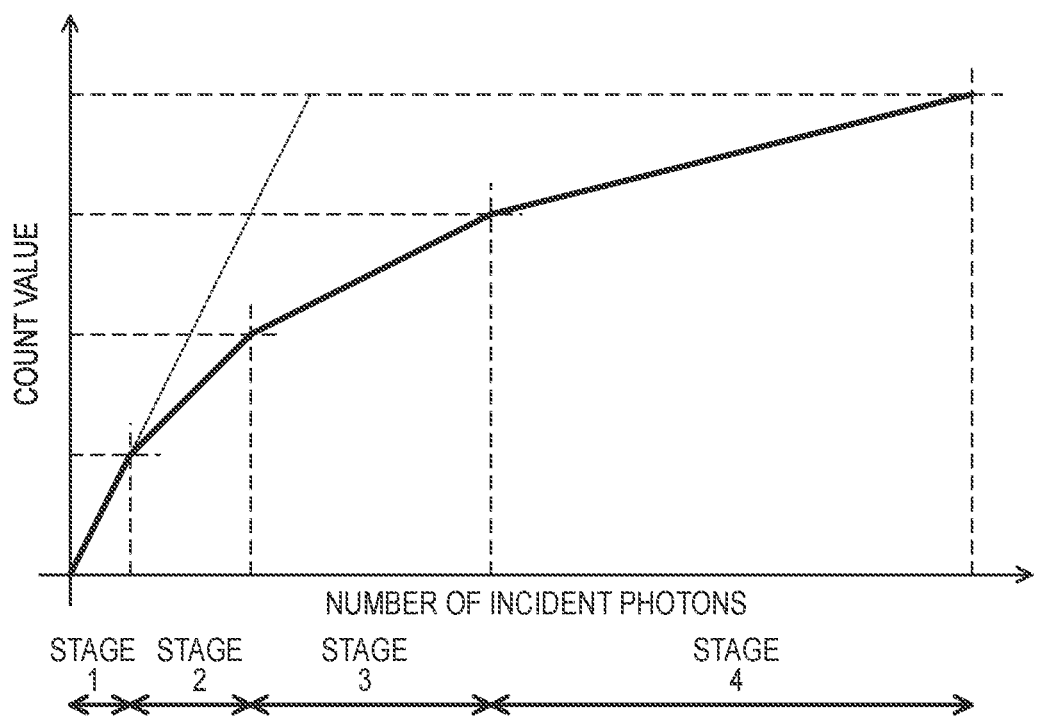
FIG. 8A is a diagram showing an example of an operation of a counter included in a unit pixel of the solid state image sensor according to the first embodiment.
FIG. 8B is a diagram showing an example of an operation of a counter included in a unit pixel of the solid state image sensor according to the first embodiment.

FIGS. 8A, 8B are diagrams showing an example of an operation of the counter 306 that is included in a unit pixel 201 of the solid state image sensor 102 according to the present embodiment. A dotted-line plot in FIGS. 8A, 8B indicates an operation of a solid state image sensor according to a comparative example. A solid-line plot in FIGS. 8A, 8B indicates an operation of the solid state image sensor according to the present embodiment.

In the solid state image sensor according to the comparative example, as indicated by the dotted line in FIGS. 8A, 8B, a count value of the counter increases in proportion to the number of photons that are incident on the unit pixel.

In contrast, according to the present embodiment, the counting frequency in the counter 306 is changed in accordance with a count value of the counter 306 as follows. Here, a description is given of an exemplary case where the bit width of the counter 306 is 14 bits.

When the count value COUNT of the counter 306 is in a range of 0 to 15, this count value COUNT belongs to stage 1. When the count value COUNT of the counter 306 belongs to stage 1, the control unit 307 supplies the control signal, or the PSEL signal, to the selector 404 of the frequency divider 305 so that the selector 404 outputs the signal PLS1. As stated earlier, as the signal PLS1, a pulse signal PLS output from the sensor unit 300 is used as is. Therefore, when the count value COUNT of the counter 306 belongs to stage 1, the counter 306 increases the count value COUNT by one each time one photon is incident on the unit pixel 201.

When the count value COUNT of the counter 306 is in a range of 16 to 255, this count value COUNT belongs to stage 2. When the count value COUNT of the counter 306 belongs to stage 2, the control unit 307 supplies the control signal, or the PSEL signal, to the selector 404 of the frequency divider 305 so that the selector 404 outputs the signal PLS2. As stated earlier, the signal PLS2 is a signal that is output from the inverting output terminal /Q of the D flip-flop 401, and is a signal that is obtained by dividing the frequency of the pulse signal PLS by two. Therefore, when the count value COUNT of the counter 306 belongs to stage 2, the counter 306 increases the count value COUNT by one each time two photons are incident on the unit pixel 201.

When the count value COUNT of the counter 306 is in a range of 256 to 4095, this count value COUNT belongs to stage 3. When the count value COUNT of the counter 306 belongs to stage 3, the control unit 307 supplies the control signal, or the PSEL signal, to the selector 404 of the frequency divider 305 so that the selector 404 outputs the signal PLS3. As stated earlier, the signal PLS3 is a signal that is output from the inverting output terminal /Q of the D flip-flop 402, and is a signal that is obtained by dividing the frequency of the pulse signal PLS by four. Therefore, when the count value COUNT of the counter 306 belongs to stage 3, the counter 306 increases the count value COUNT by one each time four photons are incident on the unit pixel 201.

When the count value COUNT of the counter 306 is in a range of 4096 to 16383, this count value COUNT belongs to stage 4. When the count value COUNT of the counter 306 belongs to stage 4, the control unit 307 supplies the control signal, or the PSEL signal, to the selector 404 of the frequency divider 305 so that the selector 404 outputs the signal PLS4. As stated earlier, the signal PLS4 is a signal that is output from the inverting output terminal /Q of the D flip-flop 403, and is a signal that is obtained by dividing the frequency of the pulse signal PLS by eight. Therefore, when the count value COUNT of the counter 306 belongs to stage 4, the counter 306 increases the count value COUNT by one each time eight photons are incident on the unit pixel 201.

As described above, according to the present embodiment, the counting frequency in the counter 306 changes in accordance with a count value in the counter 306.

Figures 9A, 9B:
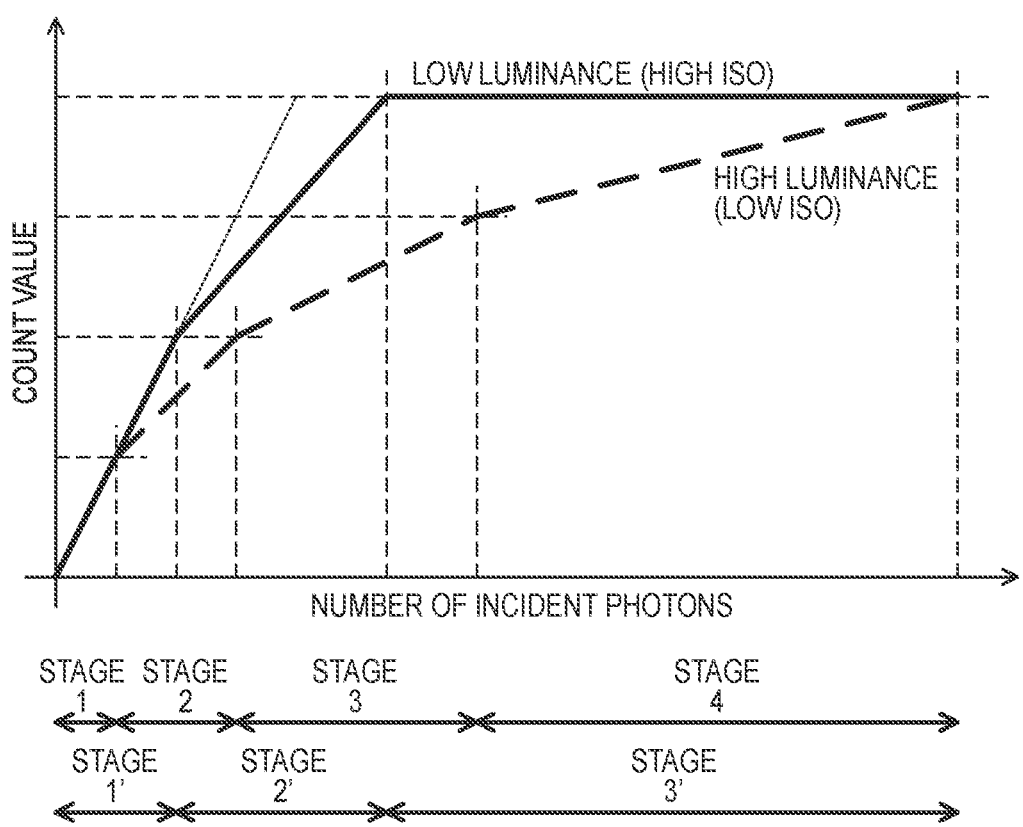
FIG. 9A is a diagram showing another example of an operation of a counter included in a unit pixel of the solid state image sensor according to the first embodiment.
FIG. 9B is a diagram showing another example of an operation of a counter included in a unit pixel of the solid state image sensor according to the first embodiment.

FIGS. 9A, 9B are diagrams showing another example of an operation of the counter 306 that is included in a unit pixel 201 of the solid state image sensor 102 according to the present embodiment.

In the example shown in FIGS. 9A, 9B, when the luminance of a subject is relatively high, that is to say, when the ISO sensitivity (ISO film speed) is set to be relatively low, control is performed similarly to the example that has been described above using FIGS. 8A, 8B.

Also, in the example shown in FIGS. 9A, 9B, when the luminance of a subject is relatively low, that is to say, when the ISO sensitivity is set to be relatively high, the following control is performed. Here, a description is given of an exemplary case where the bit width of the counter 306 is 14 bits.

When the count value COUNT of the counter 306 is in a range of 0 to 255, this count value COUNT belongs to stage 1'. When the count value COUNT of the counter 306 belongs to stage 1', the control unit 307 supplies the control signal, or the PSEL signal, to the selector 404 of the frequency divider 305 so that the selector 404 outputs the signal PLS1. As stated earlier, as the signal PLS1, a pulse signal PLS that is output from the sensor unit 300 is used as is. Therefore, when the count value COUNT of the counter 306 belongs to stage 1', the counter 306 increases the count value COUNT by one each time one photon is incident on the unit pixel 201.

When the count value COUNT of the counter 306 is in a range of 256 to 16383, this count value COUNT belongs to stage 2'. When the count value COUNT of the counter 306 belongs to stage 2', the control unit 307 supplies the control signal, or the PSEL signal, to the selector 404 of the frequency divider 305 so that the selector 404 outputs the signal PLS2. As stated earlier, the signal PLS2 is a signal that is output from the inverting output terminal /Q of the D flip-flop 401, and is a signal that is obtained by dividing the frequency of the pulse signal PLS by two. Therefore, when the count value COUNT of the counter 306 belongs to stage 2', the counter 306 increases the count value COUNT by one each time two photons are incident on the unit pixel 201.

When the number of pulse signals PLS output from the sensor unit 300 exceeds 16383, this count value COUNT belongs to stage 3', and the count value of the counter 306 is fixed to 16383. When the count value COUNT of the counter 306 belongs to stage 3', the control unit 307 supplies the control signal, or the PSEL signal, to the selector 404 of the frequency divider 305 so that the selector 404 does not output the signal PLSx. Therefore, when the count value COUNT of the counter 306 belongs to stage 3', the counter 306 does not increase the count value COUNT even if photons are incident on the unit pixel 201.

Note that the count compression control signal CCS is supplied from the count compression control unit 206 to the control unit 307 included in each unit pixel 201, and the control unit 307 performs the foregoing control based on the count compression control signal CCS.

Furthermore, the control unit 106 supplies compression pattern information (table) shown in FIG. 8B and FIG. 9B to the restoration unit 109. Based on the compression pattern information supplied from the control unit 106, the restoration unit 109 performs restoration processing so that image signals obtained by the solid state image sensor 102 turn into linear signals corresponding to the number of incident photons.

As described above, according to the present embodiment, the counting frequency in the counter 306 changes in accordance with a count value in the counter 306. Therefore, in the present embodiment, the bit width of image data can be reduced while sufficiently ensuring the dynamic range. As the bit width of image data can be reduced, the counter 306 and the readout memory 309 can be reduced in scale, thereby contributing to an increase in the number of pixels. Furthermore, as the bit width of image data can be reduced, the capacity of a non-illustrated frame memory and the like provided outside the solid state image sensor 102 can be reduced, thereby contributing to a reduction in cost as well.

Second Embodiment

A solid state image sensor and an image capturing apparatus according to a second embodiment will be described using FIG. 10 to FIG. 13. Constituent elements that are the same as those of the solid state image sensor and the like shown in FIG. 1 to FIG. 9B according to the first embodiment are given the same reference numerals thereas to omit or simplify the explanation.

The solid state image sensor according to the present embodiment changes the counting frequency in a counter 1002 using an enable signal PEN2 generated by an enable signal generation unit 1001 included in a unit pixel 201.

Figure 10:
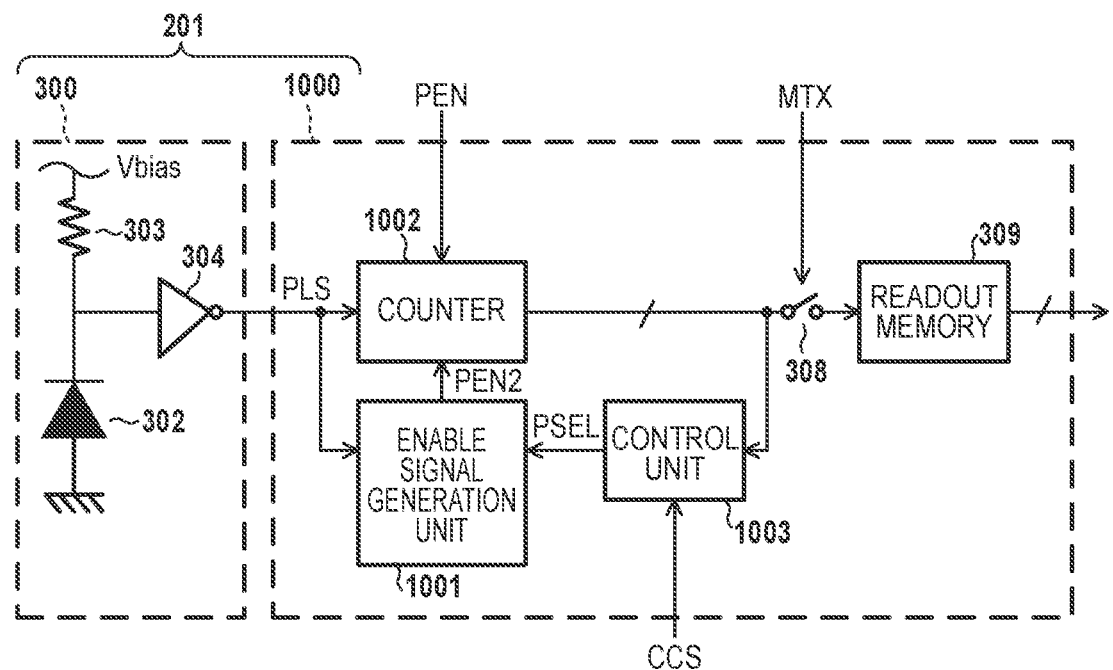
FIG. 10 is a diagram showing a unit pixel included in a solid state image sensor according to a second embodiment.

FIG. 10 is a diagram showing a unit pixel 201 included in the solid state image sensor according to the present embodiment. As shown in FIG. 10, the unit pixel 201 included in the solid state image sensor according to the present embodiment has a sensor unit 300 and a counter unit 1000. The counter unit 1000 has an enable signal generation unit 1001, a counter 1002, a control unit 1003, a switch 308, and a readout memory 309.

A pulse signal PLS output from the sensor unit 300 is supplied to the enable signal generation unit 1001. A control signal PSEL output from the control unit 1003 is supplied to the enable signal generation unit 1001. The enable signal generation unit 1001 supplies an enable signal PEN2 for placing the counter 1002 in an enabled state to the counter 1002. Based on a count value in the counter 1002, the enable signal generation unit 1001 adjusts a period in which the counter 1002 is placed in a first state and a period in which the counter 1002 is placed in a second state. The first state is a state where the counter 1002 counts pulse signals PLS issued from the sensor unit 300. The second state is a state where the counter 1002 does not count pulse signals PLS issued from the sensor unit 300. Note that the configuration and operation of the enable signal generation unit 1001 will be described later using FIG. 11.

Pulse signals PLS output from the sensor unit 300 are supplied to the counter 1002. The counter 1002 counts the number of pulse signals PLS. A count value obtained by the counter 1002 serves as a pixel signal. An enable signal PEN for controlling the counting operation in the counter 1002 is supplied from the timing generator 204 to the counter 1002. The enable signal PEN2 for controlling the counting operation in the counter 1002 is supplied from the enable signal generation unit 1001 to the counter 1002. The counter 1002 can switch between the first state which is a state where pulse signals PLS issued from the sensor unit 300 are counted, and the second state which is a state where pulse signals PLS issued from the sensor unit 300 are not counted. The configuration and operation of the counter 1002 will be described later using FIG. 12.

The control unit 1003 supplies the control signal PSEL for controlling the counting frequency to the enable signal generation unit 1001 based on a count compression control signal CCS supplied from the count compression control unit 206 and a count value output from the counter 1002.

The count compression control signal CCS is supplied from the count compression control unit 206 to the control unit 1003 included in each unit pixel 201. Based on the count compression control signal CCS, the control unit 1003 performs control similar to the control in the solid state image sensor according to the first embodiment that has been described above using FIGS. 8A, 8B and FIGS. 9A, 9B.

Figure 11:
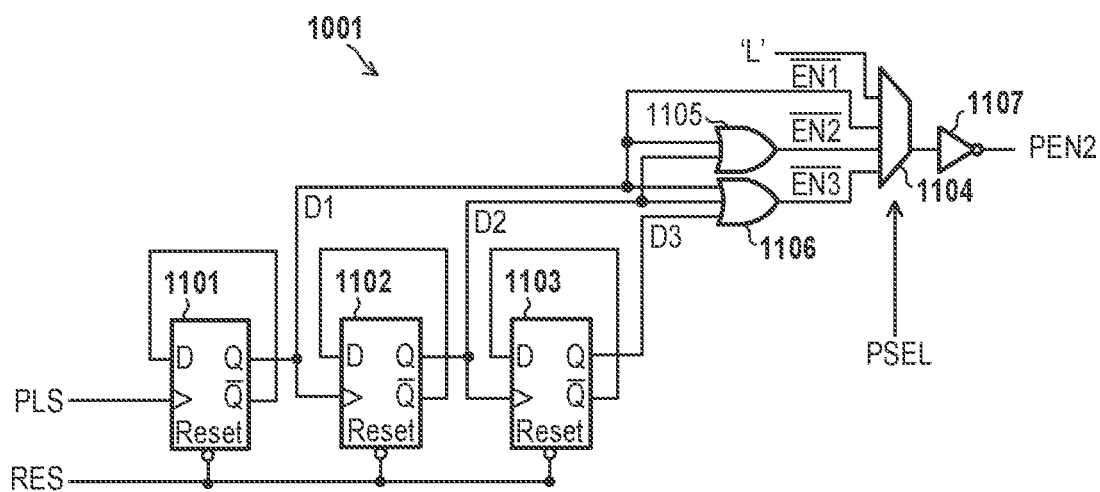
FIG. 11 is a diagram showing an enable signal generation unit included in a unit pixel of the solid state image sensor according to the second embodiment.

FIG. 11 is a diagram showing the enable signal generation unit 1001 included in a unit pixel 201 of the solid state image sensor according to the present embodiment.

FIG. 11 shows an example of the enable signal generation unit 1001 that includes three D flip-flops 1101 to 1103.

The enable signal generation unit 1001 has three D flip-flops 1101 to 1103, a selector 1104, OR gates 1105, 1106, and an inverter 1107. A control signal, or a PSEL signal, for controlling the counting frequency is supplied from the control unit 1003 to the enable signal generation unit 1001. Also, a reset signal RES is supplied from the timing generator 204 to the enable signal generation unit 1001. A pulse signal PLS output from the sensor unit 300 is supplied to a clock terminal of the D flip-flop 1101. A signal output from an inverting output terminal /Q of the D flip-flop 1101 is supplied to an input terminal D of the D flip-flop 1101.

A signal D1 output from an output terminal Q of the D flip-flop 1101 is supplied to a clock terminal of the D flip-flop 1102. A signal output from an inverting output terminal /Q of the D flip-flop 1102 is supplied to an input terminal D of the D flip-flop 1102.

A signal D2 output from an output terminal Q of the D flip-flop 1102 is supplied to a clock terminal of the D flip-flop 1103. Also, a signal output from an inverting output terminal /Q of the D flip-flop 1103 is supplied to an input terminal D of the D flip-flop 1103.

The reset signal RES output from the timing generator 204 is supplied to reset terminals Reset of the D flip-flops 1101, 1102, 1103. When the reset signal RES is at the H level, the output terminals Q of the D flip-flops 1101, 1102, 1103 are reset to the L level.

A two-bit control signal PSEL output from the control unit 1003 is supplied to the selector 1104. The following four signals are input to the selector 1104. A signal that is fixed to the L level, a signal /EN1 that is the signal D1 output from the output terminal Q of the D flip-flop 401 as is, and a signal /EN2 output from the OR gate 1105 are supplied to the selector 1104. A signal /EN3 output from the OR gate 1106 is further supplied to the selector 1104.

The signal D1 output from the output terminal Q of the D flip-flop 1101 and the signal D2 output from the output terminal Q of the D flip-flop 1102 are supplied to the OR gate 1105. The signal D1 output from the output terminal Q of the D flip-flop 1101, the signal D2 output from the output terminal Q of the D flip-flop 1102, and the signal D3 output from the output terminal Q of the D flip-flop 1103 are supplied to the OR gate 1106.

The signal /EN1 is the signal D1 output from the output terminal Q of the D flip-flop 1101, and is a signal that is obtained by dividing the frequency of the pulse signal PLS by two. One active-low signal /EN1 is issued with respect to two pulse signals PLS.

The signal /EN2 output from the OR gate 1105 is a signal representing a logical sum of the signal D1 output from the output terminal Q of the D flip-flop 1101 and the signal D2 output from the output terminal Q of the D flip-flop 1102. One active-low signal /EN2 is issued with respect to four pulse signals PLS.

The signal /EN3 output from the OR gate 1105 is a logical sum of the signal D1, the signal D2, and the signal D3. As stated earlier, the signal D1 is a signal output from the output terminal Q of the D flip-flop 1101. As stated earlier, the signal D2 is a signal output from the output terminal Q of the D flip-flop 1102, and the signal D3 is the signal D3 output from the output terminal Q of the D flip-flop 1103. One active-low signal /EN3 is issued with respect to eight pulse signals PLS.

The selector 1104 outputs a signal that is selected from among the four signals in accordance with the control signal PSEL supplied from the control unit 307. The enable signal PEN2 is generated by inverting the signal output from the selector 1104 using the inverter 1107.

Note that the configuration of the enable signal generation unit 1001 is not limited to this. An enable signal generation unit 1001 that can change a period in which the enable signal PEN2 is placed in the H level in accordance with the control signal PSEL supplied from the control unit 1003 can be used where appropriate.

FIG. 12 is a diagram showing the counter 1002 included in a unit pixel 201 of the solid state image sensor according to the present embodiment. FIG. 12 shows an example of an n-bit counter that has n D flip-flops 1200-1 to 1200-n. The counter 1002 performs a counting operation in synchronization with a rising edge of a pulse signal PLS output from the sensor unit 300.

As shown in FIG. 12, the counter 1002 has n D flip-flops 1200-1 to 1200-n and an AND gate 1201. Reference numerals 1200-1 to 1200-n are used in explaining individual D flip-flops, whereas a reference numeral 1200 is used in explaining D flip-flops in general.

A pulse signal PLS output from the sensor unit 300 is supplied to a clock terminal of the D flip-flop 1200-1. A signal output from an inverting output terminal /Q of the D flip-flop 1200-1 is supplied to a clock terminal of the D flip-flop 1200-2. A signal output from an inverting output terminal /Q of the D flip-flop 1200-2 is supplied to a clock terminal of the D flip-flop 1200-3. A signal output from an inverting output terminal /Q of the D flip-flop 1200-n–1 is supplied to a clock terminal of the D flip-flop 1200-n. That is to say, to the clock terminal of each D flip-flop 1200, a signal output from the inverting output terminal /Q of the D flip-flop 1200 that is disposed at an immediately preceding stage is supplied.

A reset signal RES output from the timing generator 204 is supplied to a reset terminal Reset of each D flip-flop 1200. When the reset signal RES is at the H level, an output terminal Q of each D flip-flop 1200 is reset to the L level. When the reset signal RES is at the L level, values of respective bits of a count value (COUNT[1], COUNT[2], ..., COUNT[n]) are output from the output terminals Q of the respective D flip-flops 1200. As the counter 1002 is configured in this manner, the count value COUNT increases one by one in synchronization with a rising edge of the pulse signal PLS supplied from the sensor unit 300.

The enable signal PEN and the enable signal PEN2 are supplied to the AND gate 1201. When both of the enable signal PEN and the enable signal PEN2 are at the H level, an H-level signal output from the AND gate 1201 is supplied to enable terminals EN of the D flip-flops 1200. When the H-level signal is supplied to the enable terminals EN of the D flip-flops 1200, the count value COUNT of the counter 1002 increases in synchronization with a rising edge of the pulse signal PLS. When at least one of the enable signal PEN and the enable signal PEN2 is placed in the L level, the signal supplied from the AND gate 1201 to the enable terminals EN of the D flip-flops 1200 are placed in the L level. When the enable terminals EN of the D flip-flops 1200 are at the L level, the count value COUNT of the counter 1002 is maintained without being updated even if the pulse signal PLS rises.

The solid state image sensor according to the present embodiment can operate similarly to the solid state image sensor according to the first embodiment that has been described above using FIGS. 8A, 8B. An example of an operation of the solid state image sensor according to the present embodiment will be described using FIGS. 8A, 8B.

When the count value COUNT of the counter 1002 is in a range of 0 to 15, this count value COUNT belongs to stage 1. When the count value COUNT of the counter 1002 belongs to stage 1, the control unit 1003 supplies the control signal, or the PSEL signal, to the selector 1104 of the enable signal generation unit 1001 so that the selector 1104 outputs an L-level signal. The L-level signal output from the selector 1104 of the enable signal generation unit 1001 is inverted by the inverter 1107. Therefore, the H-level enable signal PEN2 is supplied from the enable signal generation unit 1001 to the counter 1002. During an exposure period, the enable signal PEN is always at the H level. As both of the enable signal PEN and the enable signal PEN2 are at the H level, an H-level signal is supplied from the AND gate 1201 to the enable terminals EN of the D flip-flops 1200. Therefore, when the count value COUNT of the counter 1002 belongs to stage 1, the counter 1002 increases the count value COUNT by one each time one photon is incident on the unit pixel 201.

When the count value COUNT of the counter 1002 is in a range of 16 to 255, this count value COUNT belongs to stage 2. When the count value COUNT of the counter 1002 belongs to stage 2, the control unit 1003 supplies the control signal, or the PSEL signal, to the selector 1104 of the enable signal generation unit 1001 so that the selector 1104 outputs the signal /EN1. As stated earlier, the signal /EN1 is the signal D1 output from the output terminal Q of the D flip-flop 1101, and is a signal that is obtained by dividing the frequency of the pulse signal PLS by two. As stated earlier, one active-low signal /EN1 is issued with respect to two pulse signals PLS. The signal /EN1 output from the selector 1104 of the enable signal generation unit 1001 is inverted by the inverter 1107. Therefore, one active-high enable signal PEN2 is issued from the enable signal generation unit 1001 with respect to two pulse signals PLS. As stated earlier, during an exposure period, the enable signal PEN is always at the H level. Therefore, one active-high signal is supplied from the AND gate 1201 to the enable terminals EN of the D flip-flops 1200 with respect to two pulse signals PLS. Thus, when the count value COUNT of the counter 1002 belongs to stage 2, the counter 1002 increases the count value COUNT by one each time two photons are incident on the unit pixel 201.

When the count value COUNT of the counter 1002 is in a range of 256 to 4095, this count value COUNT belongs to stage 3. When the count value COUNT of the counter 1002 belongs to stage 3, the control unit 1003 supplies the control signal, or the PSEL signal, to the selector 1104 of the enable signal generation unit 1001 so that the selector 1104 outputs the signal /EN2. As stated earlier, the signal /EN2 is a signal representing a logical sum of the signal D1 output from the output terminal Q of the D flip-flop 1101 and the signal D2 output from the output terminal Q of the D flip-flop 1102. As stated earlier, one active-low signal /EN2 is issued with respect to four pulse signals PLS. The signal /EN2 output from the selector 1104 of the enable signal generation unit 1001 is inverted by the inverter 1107. Therefore, one active-high enable signal PEN2 is issued from the enable signal generation unit 1001 with respect to four pulse signals PLS. As stated earlier, during an exposure period, the enable signal PEN is always at the H level. Therefore, one active-high signal is supplied from the AND gate 1201 to the enable terminals EN of the D flip-flops 1200 with respect to four pulse signals PLS. Thus, when the count value COUNT of the counter 1002 belongs to stage 3, the counter 1002 increases the count value COUNT by one each time four photons are incident on the unit pixel 201.

When the count value COUNT of the counter 1002 is in a range of 4096 to 16383, this count value COUNT belongs to stage 4. When the count value COUNT of the counter 1002 belongs to stage 4, the control unit 1003 supplies the control signal, or the PSEL signal, to the selector 404 so that the selector 1104 of the enable signal generation unit 1001 outputs the signal /EN3. The signal /EN3 is a signal representing a logical sum of the signal D1 output from the output terminal Q of the D flip-flop 1101, the signal D2 output from the output terminal Q of the D flip-flop 1102, and the signal D3 output from the output terminal Q of the D flip-flop 1103. As stated earlier, one active-low signal /EN3 is issued with respect to eight pulse signals PLS. The signal /EN3 output from the selector 1104 of the enable signal generation unit 1001 is inverted by the inverter 1107. Therefore, one active-high enable signal PEN2 is issued from the enable signal generation unit 1001 with respect to eight pulse signals PLS. As stated earlier, during an exposure period, the enable signal PEN is always at the H level. Therefore, one active-high signal is supplied from the AND gate 1201 to the enable terminals EN of the D flip-flops 1200 with respect to eight pulse signals PLS. Thus, when the count value COUNT of the counter 1002 belongs to stage 4, the counter 1002 increases the count value COUNT by one each time eight photons are incident on the unit pixel 201.

As described above, in the present embodiment also, the counting frequency in the counter 1002 changes in accordance with a count value in the counter 1002.

The solid state image sensor according to the present embodiment can also operate similarly to the solid state image sensor according to the first embodiment that has been described above using FIGS. 9A, 9B. Another example of an operation of the solid state image sensor according to the present embodiment will be described using FIGS. 9A, 9B.

In the example shown in FIGS. 9A, 9B, when the luminance of a subject is relatively high, that is to say, when the ISO sensitivity is set to be relatively low, control is performed similarly to the example that has been described above using FIGS. 8A, 8B.

Also, in the example shown in FIGS. 9A, 9B, when the luminance of a subject is relatively low, that is to say, when the ISO sensitivity is set to be relatively high, the following control is performed. Here, a description is given of an exemplary case where the bit width of the counter 1002 is 14 bits.

When the count value COUNT of the counter 1002 is in a range of 0 to 255, this count value COUNT belongs to stage 1'. When the count value COUNT of the counter 1002 belongs to stage 1', the control unit 1003 supplies the control signal, or the PSEL signal, to the selector 1104 of the enable signal generation unit 1001 so that the selector 1104 outputs an L-level signal. The L-level signal output from the selector 1104 of the enable signal generation unit 1001 is inverted by the inverter 1107. Therefore, the H-level enable signal PEN2 is supplied from the enable signal generation unit 1001 to the counter 1002. Thus, when the count value COUNT of the counter 1002 belongs to stage 1', an H-level signal is supplied from the AND gate 1201 to the enable terminals EN of the D flip-flops 1200. Hence, when the count value COUNT of the counter 1002 belongs to stage 1', the counter 1002 increases the count value COUNT by one each time one photon is incident on the unit pixel 201.

When the count value COUNT of the counter 1002 is in a range of 256 to 16383, this count value COUNT belongs to stage 2'. When the count value COUNT of the counter 1002 belongs to stage 2', the control unit 1003 supplies the control signal, or the PSEL signal, to the selector 1104 of the enable signal generation unit 1001 so that the selector 1104 outputs the signal /EN1. As stated earlier, the signal /EN1 is the signal D1 output from the output terminal Q of the D flip-flop 1101, and is a signal that is obtained by dividing the frequency of a pulse signal PLS by two. As stated earlier, one active-low signal /EN1 is issued with respect to two pulse signals PLS. The signal /EN1 output from the selector 1104 of the enable signal generation unit 1001 is inverted by the inverter 1107. Therefore, one active-high enable signal PEN2 is issued from the enable signal generation unit 1001 with respect to two pulse signals PLS. As stated earlier, during an exposure period, the enable signal PEN is always at the H level. Therefore, one active-high signal is supplied from the AND gate 1201 to the enable terminals EN of the D flip-flops 1200 with respect to two pulse signals PLS. Thus, when the count value COUNT of the counter 1002 belongs to stage 2', the counter 1002 increases the count value COUNT by one each time two photons are incident on the unit pixel 201.

When the number of pulse signals PLS output from the sensor unit 300 exceeds 16383, this count value COUNT belongs to stage 3', and the count value of the counter 1002 is fixed to 16383. When the count value COUNT of the counter 1002 belongs to stage 3', the control unit 1003 supplies the control signal, or the PSEL signal, to the selector 1104 of the enable signal generation unit 1001 so that the selector 1104 does not select a signal. Therefore, an output from the selector 1104 is placed in the H level. The output from the selector 1104 is inverted by the inverter 1107; thus, when the output from the selector 1104 is at the H level, a signal supplied from the enable signal generation unit 1001 to the AND gate 1201 of the counter 1002 is placed in the L level. Therefore, a signal supplied from the AND gate 1201 to the enable terminals EN of the D flip-flops 1200 is placed in the L level. Thus, when the count value COUNT of the counter 1002 belongs to stage 3', the counter 1002 does not increase the count value COUNT even if photons are incident on the unit pixel 201.

Note that the count compression control signal CCS is supplied from the count compression control unit 206 to the control unit 1003 included in each unit pixel 201, and the control unit 1003 performs the foregoing control based on the count compression control signal CCS.

Furthermore, the control unit 1003 supplies compression pattern information shown in FIG. 8B and FIG. 9B to the restoration unit 109. Using the compression pattern information supplied from the control unit 1003, the restoration unit 109 performs restoration processing so that image signals obtained by the solid state image sensor 102 turn into linear signals corresponding to the number of incident photons.

As described above, in the present embodiment also, the counting frequency in the counter 1002 changes in accordance with a count value in the counter 1002. Therefore, in the present embodiment also, the bit width of image data can be reduced while sufficiently ensuring the dynamic range.

Third Embodiment

A solid state image sensor and an image capturing apparatus according to a third embodiment will be described using FIG. 13 to FIG. 16. Constituent elements that are the same as those of the solid state image sensor and the like shown in FIG. 1 to FIG. 12 according to the first or second embodiment are given the same reference numerals thereas to omit or simplify the explanation.

Figure 13:
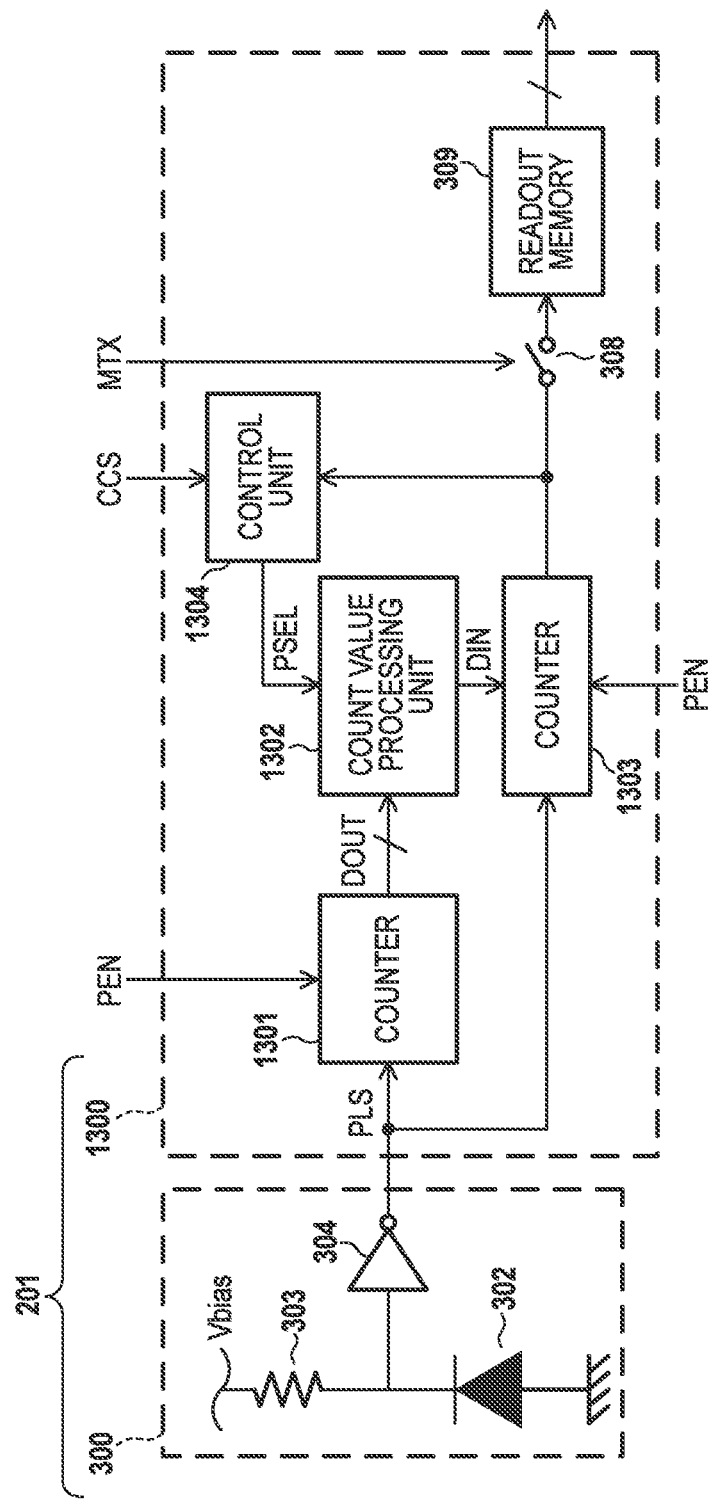
FIG. 13 is a diagram showing a unit pixel included in a solid state image sensor according to a third embodiment.

FIG. 13 is a diagram showing a unit pixel 201 included in the solid state image sensor according to the present embodiment. As shown in FIG. 13, the unit pixel 201 included in the solid state image sensor according to the present embodiment has a sensor unit 300 and a counter unit 1300. The counter unit 1300 has a counter 1301, a count value processing unit 1302, a counter 1303, a control unit 1304, a switch 308, and a readout memory 309.

Pulse signals PLS output from the sensor unit 300 are supplied to the counter 1301. The counter 1301 counts the number of pulse signals PLS. An enable signal PEN for controlling the counting operation in the counter 1301 is supplied from the timing generator 204 to the counter 1301. The counter 1301 performs a counting operation in synchronization with a rising edge of a pulse signal PLS. The configuration of the counter 1301 is similar to, for example, that of the counter 306 that has been described above using FIG. 5.

A count value DOUT output from the counter 1301 is supplied to the count value processing unit 1302. The count value processing unit 1302 supplies a signal DIN to the counter 1303. The count value processing unit 1302 generates a plurality of signals by applying such processing as bit shifting to the count value DOUT. The count value processing unit 1302 selects one of the plurality of generated signals in accordance with a control signal PSEL supplied from the control unit 1304. The count value processing unit 1302 supplies the signal that has been selected in this manner as the signal DIN to the counter 1303. The configuration and operation of the count value processing unit 1302 will be described later using FIG. 14.

Pulse signals PLS output from the sensor unit 300 are supplied to the counter 1303. The counter 1303 counts the number of pulse signals PLS. A count value obtained by the counter 1303 serves as a pixel signal. The signal DIN is supplied from the count value processing unit 1302 to the counter 1303. The configuration and operation of the counter 1303 will be described later using FIG. 15.

A count compression control signal CCS is supplied from the count compression control unit 206 to the control unit 1304 included in each unit pixel 201. The control unit 1304 outputs the control signal PSEL for controlling the counting frequency in accordance with the count compression control signal CCS supplied from the count compression control unit 206 and the count value supplied from the counter 1303. The control signal PSEL output from the control unit 1304 is supplied to the count value processing unit 1302. With the supply of the appropriate control signal PSEL from the control unit 1304 to the count value processing unit 1302, control similar to the control in the solid state image sensors according to the first and second embodiments that has been described above using FIGS. 8A, 8B and FIGS. 9A, 9B is performed.

Figure 14:
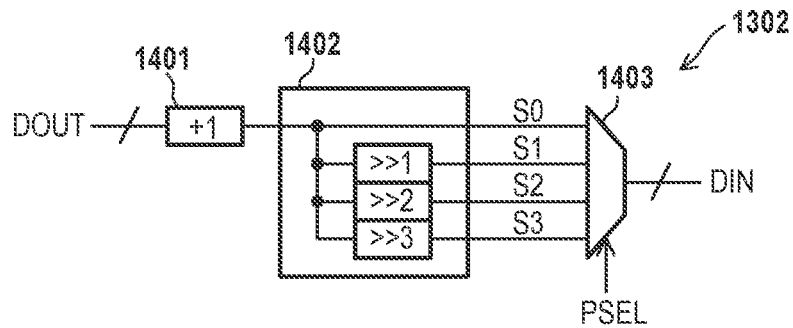
FIG. 14 is a diagram showing a count value processing unit included in a unit pixel of the solid state image sensor according to the third embodiment.

FIG. 14 is a diagram showing the count value processing unit 1302 included in a unit pixel 201 of the solid state image sensor according to the present embodiment.

The count value processing unit 1302 has an adder 1401, a bit shift unit 1402, and a selector 1403. A control signal PSEL for controlling the counting frequency is supplied from the control unit 1304 to the count value processing unit 1302.

A count value DOUT output from the counter 1301 is supplied to the adder 1401. The adder 1401 supplies, to the bit shift unit 1402, a value obtained by adding one to the count value DOUT supplied from the counter 1301.

The bit shift unit 1402 supplies a value S0, which is the value supplied from the adder 1401 as is, to the selector 1403. The bit shift unit 1402 also supplies a value S1, which is obtained by shifting the value supplied from the adder 1401 by one toward the least significant side, to the selector 1403. The bit shift unit 1402 also supplies a value S2, which is obtained by shifting the value supplied from the adder 1401 by two toward the least significant side, to the selector 1403. The bit shift unit 1402 also supplies a value S3, which is obtained by shifting the value supplied from the adder 1401 by three toward the least significant side, to the selector 1404.

The selector 1403 is controlled by a two-bit control signal PSEL supplied from the control unit 1304. The selector 1403 selects one of the four values S0 to S3 output from the bit shift unit 1402 in accordance with the control signal PSEL supplied from the control unit 1304, and outputs the selected signal as a signal DIN.

Note that the configuration of the count value processing unit 1302 is not limited to this. A count value processing unit 1302 that can switch the signal DIN to a predetermined value in accordance with the control signal PSEL supplied from the control unit 1304 can be used where appropriate.

Figure 15:
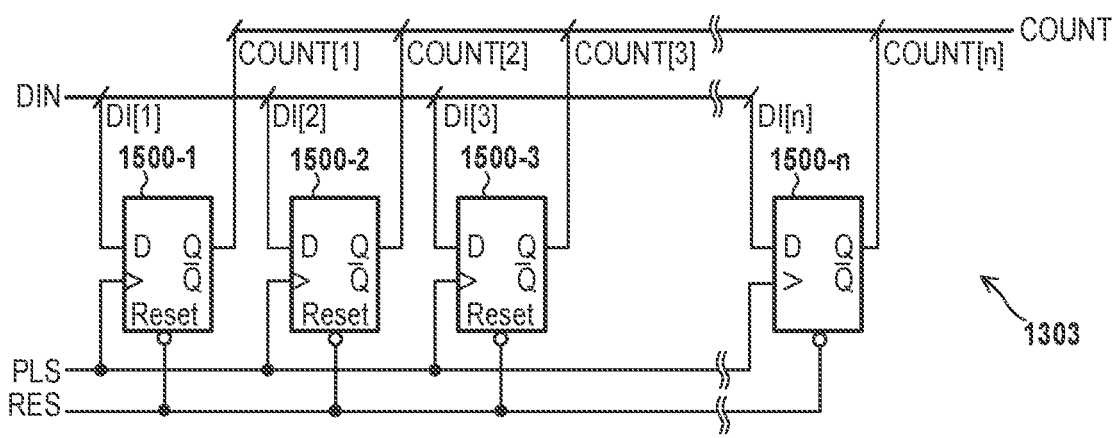
FIG. 15 is a diagram showing a counter included in a unit pixel of the solid state image sensor according to the third embodiment.

FIG. 15 is a diagram showing the counter 1303 included in a unit pixel 201 of the solid state image sensor according to the present embodiment. FIG. 15 shows an example of an n-bit counter that has n D flip-flops 1500-1 to 1500-$n$. The counter 1303 performs a counting operation in synchronization with a rising edge of a pulse signal PLS output from the sensor unit 300.

As shown in FIG. 15, the counter 1303 has n D flip-flops 1500-1 to 1500-$n$. Reference numerals 1500-1 to 1500-$n$ are used in explaining individual D flip-flops, whereas a reference numeral 1500 is used in explaining D flip-flops in general.

A pulse signal PLS output from the sensor unit 300 is supplied to respective clock terminals of the D flip-flops 1500. A reset signal RES output from the timing generator 204 is supplied to respective reset terminals Reset of the D flip-flops 1500. When the reset signal RES is at the H level, an output terminal Q of each D flip-flop 1500 is reset to the L level. When the reset signal RES is at the L level, values of respective bits of a count value (COUNT[1], COUNT[2], . . . , COUNT[n]) are output from the output terminals Q of the respective D flip-flops 1500. As the counter 1303 is configured in this manner, the count value COUNT of the counter 1303 increases one by one in synchronization with a rising edge of the pulse signal PLS output from the sensor unit 300.

Values of respective bits of the signal DIN output from the count value processing unit 1302 are input to respective input terminals D of the D flip-flops 1500. A value DI[1] of the least significant bit of the signal DIN output from the count value processing unit 1302 is supplied to the input terminal D of the D flip-flop 1500-1. A value DI[n] of the most significant bit of the signal DIN output from the count value processing unit 1302 is supplied to the input terminal D of the D flip-flop 1500-$n$. The count value COUNT output from the counter 1303 changes depending on the signal DIN input to the counter 1303. The count value can be compressed by appropriately performing processing with respect to the count value DOUT in the count value processing unit 1302.

Figure 16:
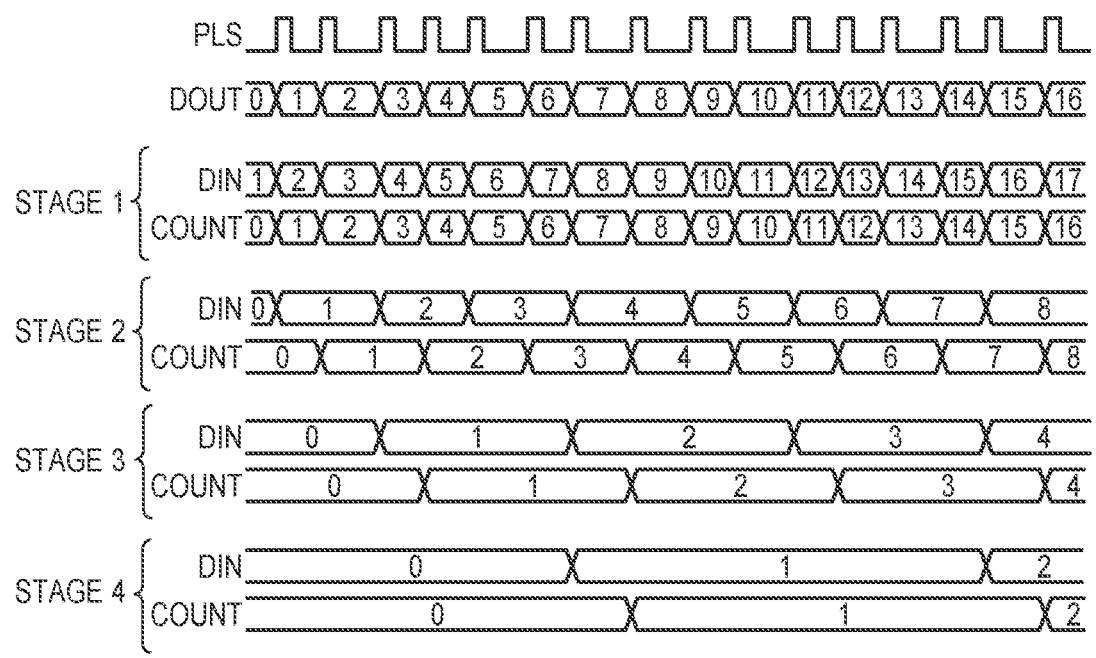
FIG. 16 is a timing chart showing an operation of a counter unit included in a unit pixel of the solid state image sensor according to the third embodiment.

FIG. 16 is a timing chart showing the operations of the counter unit 1300 included in a unit pixel 201 of the solid state image sensor according to the present embodiment. FIG. 16 shows the operations in the respective stages 1 to 4 that have been described above using FIGS. 8A, 8B.

In stage 1, the adder 1401 adds one to the count value DOUT output from the counter 1301. A value obtained by adding one to the count value DOUT is supplied to the counter 1303 as the signal DIN. The count value COUNT output from the counter 1303 is updated, in synchronization with a rising edge of a pulse signal PLS, based on the signal DIN supplied from the count value processing unit 1302. Therefore, in stage 1, the count value of the counter 1303 increases by one in synchronization with the pulse signal PLS. That is to say, the count value of the counter 1303 increases by one each time one photon is incident on the unit pixel 201.

In stage 2, the adder 1401 adds one to the count value DOUT output from the counter 1301. A value obtained by adding one to the count value DOUT is shifted by the bit shift unit 1402 by one bit toward the least significant side. A value thus obtained is supplied to the counter 1303 as the signal DIN. The count value COUNT output from the counter 1303 is updated, in synchronization with a rising edge of the pulse signal PLS, based on the signal DIN supplied from the count value processing unit 1302. Therefore, in stage 2, the count value of the counter 1303 increases by one each time two pulse signals PLS are input. That is to say, the count value of the counter 1303 increases by one each time two photons are incident on the unit pixel 201.

In stage 3, the adder 1401 adds one to the count value DOUT output from the counter 1301. A value obtained by adding one to the count value DOUT is shifted by the bit shift unit 1402 by two bits toward the least significant side. A value thus obtained is supplied to the counter 1303 as the signal DIN. The count value COUNT output from the counter 1303 is updated, in synchronization with a rising edge of the pulse signal PLS, based on the signal DIN supplied from the count value processing unit 1302. Therefore, in stage 3, the count value of the counter 1303 increases by one each time four pulse signals PLS are input. That is to say, the count value of the counter 1303 increases by one each time four photons are incident on the unit pixel 201.

In stage 4, the adder 1401 adds one to the count value DOUT output from the counter 1301. A value obtained by adding one to the count value DOUT is shifted by the bit shift unit 1402 by three bits toward the least significant side. A value thus obtained is supplied to the counter 1303 as the signal DIN. The count value COUNT output from the counter 1303 is updated, in synchronization with a rising edge of a pulse signal PLS, based on the signal DIN supplied from the count value processing unit 1302. Therefore, in stage 4, the count value of the counter 1303 increases by one each time eight pulse signals PLS are input. That is to say, the count value of the counter 1303 increases by one each time eight photons are incident on the unit pixel 201.

As described above, in the present embodiment also, the counting frequency changes in accordance with a count value of the counter.

Modified Embodiments

Although the embodiments of the present invention have been described above, the present invention is not limited to these embodiments, and various modifications and changes can be made within the scope of the essential spirit thereof. For example, although the above embodiments have been described using an exemplary case that uses an increment-type counter that increases a count value in synchronization with a pulse signal PLS, no limitation is intended by this. For example, a decrement-type counter that reduces a count value in synchronization with a pulse signal PLS may be used.

Furthermore, although the above embodiments have been described using a case where a count value increases linearly relative to the number of pulse signals PLS, no limitation is intended by this. For example, a count value may increase non-linearly relative to the number of pulse signals PLS.

According to the present invention, it is possible to provide a solid state image sensor, an image capturing apparatus, and an image capturing method that can realize a wide dynamic range while suppressing an increase in a signal amount.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A solid state image sensor, comprising:
   a sensor that issues pulses at a frequency corresponding to a frequency at which photons are incident; and
   a counter circuit that thins out the pulses issued from the sensor at a thinning ratio corresponding to the number of pulses issued from the sensor, and counts the pulses.

2. The solid state image sensor according to claim 1, wherein
   the counter circuit includes a counter that counts the pulses issued from the sensor, and a controller that switches the thinning ratio in accordance with a count value in the counter.

3. The solid state image sensor according to claim 2, wherein
the controller increases the thinning ratio as the count value in the counter increases.

4. The solid state image sensor according to claim 2, wherein
the counter circuit further includes a thinning processor that performs thinning processing with respect to the pulses issued from the sensor, and
the counter counts signals obtained by performing the thinning processing in the thinning processor.

5. The solid state image sensor according to claim 2, wherein
the counter can switch between a first state and a second state, the first state being a state where the pulses issued from the sensor are counted, the second state being a state where the pulses issued from the sensor are not counted, and
based on the count value in the counter, the controller adjusts a period in which the counter is placed in the first state and a period in which the counter is placed in the second state.

6. The solid state image sensor according to claim 2, wherein
the controller switches the thinning ratio in accordance with the count value in the counter and a signal corresponding to an ISO sensitivity.

7. The solid state image sensor according to claim 1, wherein
the sensor includes an avalanche photodiode and a quenching resistor.

8. An image capturing apparatus, comprising:
a solid state image sensor having a sensor that issues pulses at a frequency corresponding to a frequency at which photons are incident, and a counter that thins out the pulses issued from the sensor at a thinning ratio corresponding to the number of pulses issued from the sensor, and counts the pulses; and
a processor that performs predetermined processing with respect to a signal output from the solid state image sensor.

9. An image capturing method, comprising:
thinning out pulses issued from a sensor at a first thinning ratio and counting the pulses, the pulses being issued at a frequency corresponding to a frequency at which photons are incident, the first thinning ratio corresponding to the number of pulses issued from the sensor; and
thinning out the pulses issued from the sensor at a second thinning ratio in accordance with the number of pulses issued from the sensor and counting the pulses, the second thinning ratio being higher than the first thinning ratio.

* * * * *